(12) United States Patent
Ishii et al.

(10) Patent No.: US 12,091,028 B2
(45) Date of Patent: Sep. 17, 2024

(54) VEHICLE DRIVING ASSISTANCE DEVICE AND NON-TRANSITORY STORAGE MEDIUM

(71) Applicant: TOYOTA JIDOSHA KABUSHIKI KAISHA, Toyota (JP)

(72) Inventors: Ryo Ishii, Toyota (JP); Takuya Kaminade, Okazaki (JP); Masashi Oishi, Owariasahi (JP); Masaki Ikai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 287 days.

(21) Appl. No.: 17/859,355

(22) Filed: Jul. 7, 2022

(65) Prior Publication Data
US 2023/0035434 A1 Feb. 2, 2023

(30) Foreign Application Priority Data
Jul. 30, 2021 (JP) .................. 2021-125725

(51) Int. Cl.
*B60W 50/12* (2012.01)
*B60W 30/18* (2012.01)
*B60W 40/04* (2006.01)
*B60W 40/08* (2012.01)

(52) U.S. Cl.
CPC ...... *B60W 50/12* (2013.01); *B60W 30/18009* (2013.01); *B60W 40/04* (2013.01); *B60W 40/08* (2013.01); *B60W 2540/10* (2013.01); *B60W 2554/4026* (2020.02); *B60W 2554/4029* (2020.02); *B60W 2554/80* (2020.02)

(58) Field of Classification Search
CPC ........... B60W 50/12; B60W 30/18009; B60W 30/18163; B60W 30/12; B60W 40/08; B60W 40/04; B60W 2540/10; B60W 2540/12; B60W 2540/18; B60W 2540/20; B60W 2554/4026; B60W 2554/4029; B60W 2554/80; B60W 2552/53
USPC ........................................................ 701/70
See application file for complete search history.

(56) References Cited

FOREIGN PATENT DOCUMENTS

JP 2012-121534 A 6/2012
JP 2021-030882 A 3/2021

*Primary Examiner* — Hai H Huynh
(74) *Attorney, Agent, or Firm* — Sughrue Mion, PLLC

(57) ABSTRACT

A vehicle driving assistance device includes a processor. The processor is configured to execute acceleration suppression control for suppressing acceleration of a driver's vehicle in a case where a predetermined prohibition condition is not satisfied when an erroneous acceleration operation precondition is satisfied while a traveling condition is satisfied. The traveling condition is a condition for determining that the driver's vehicle is traveling. The erroneous acceleration operation precondition is a precondition for determining that an acceleration operation is erroneously performed. The acceleration operation is an operation performed by a driver of the driver's vehicle to request the acceleration of the driver's vehicle. The predetermined prohibition condition is based on a relationship between the driver's vehicle and an external environment of the driver's vehicle.

14 Claims, 10 Drawing Sheets

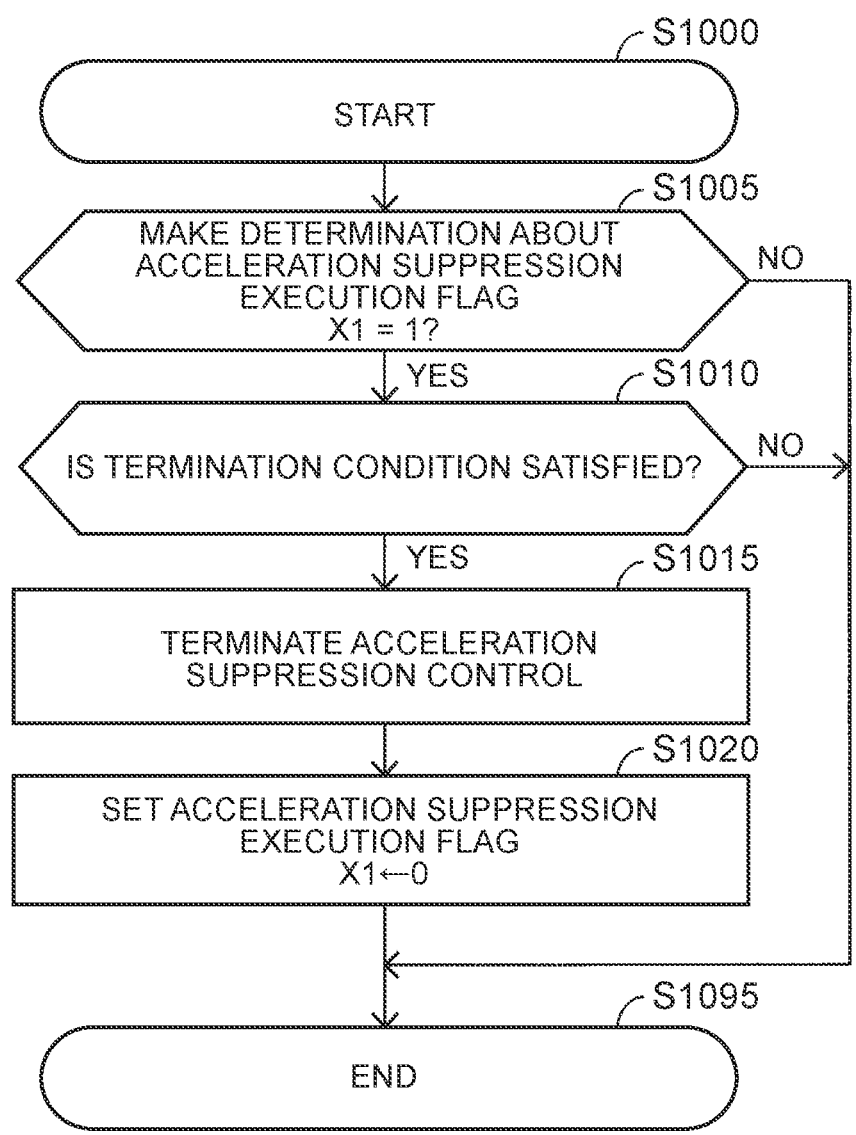

VEHICLE DRIVING ASSISTANCE DEVICE AND NON-TRANSITORY STORAGE MEDIUM

CROSS-REFERENCE TO RELATED APPLICATION

This application claims priority to Japanese Patent Application No. 2021-125725 filed on Jul. 30, 2021, incorporated herein by reference in its entirety.

BACKGROUND

1. Technical Field

The present disclosure relates to a vehicle driving assistance device and a non-transitory storage medium.

2. Description of Related Art

There is known a vehicle driving assistance device that suppresses acceleration of a driver's vehicle when an erroneous acceleration operation is performed as in a case where a driver forcefully depresses an accelerator pedal by mistake. There is also known a vehicle driving assistance device in which the condition for determining that an erroneous acceleration operation is performed (erroneous acceleration operation condition) is varied between a case where a driver's vehicle is stopped and a case where the driver's vehicle is traveling. As such vehicle driving assistance devices, there is known a vehicle driving assistance device that determines whether an erroneous acceleration operation condition is satisfied in consideration of a force and speed for depressing an accelerator pedal while a driver's vehicle is traveling (see, for example, Japanese Unexamined Patent Application Publication No. 2021-30882 (JP 2021-30882 A)).

SUMMARY

If the acceleration suppression control is executed by determining that the erroneous acceleration operation condition is satisfied without consideration of phenomena other than the force and speed for depressing the accelerator pedal, the acceleration suppression control may be executed unnecessarily.

The present disclosure provides a vehicle driving assistance device and a non-transitory storage medium, capable of further reducing unnecessary execution of acceleration suppression control while a driver's vehicle is traveling.

A vehicle driving assistance device according to the present disclosure includes a processor. The processor is configured to execute acceleration suppression control for suppressing acceleration of a driver's vehicle in a case where a predetermined prohibition condition is not satisfied when an erroneous acceleration operation precondition is satisfied while a traveling condition is satisfied. The traveling condition is a condition for determining that the driver's vehicle is traveling. The erroneous acceleration operation precondition is a precondition for determining that an acceleration operation is erroneously performed. The acceleration operation is an operation performed by a driver of the driver's vehicle to request the acceleration of the driver's vehicle. The predetermined prohibition condition is based on a relationship between the driver's vehicle and an external environment of the driver's vehicle.

When the acceleration operation is erroneously performed (erroneous acceleration operation) while the driver's vehicle is traveling, the driver's vehicle and its external environment may have a specific relationship due to the state in which the driver's vehicle is traveling.

With the present disclosure, the acceleration suppression control is executed when the predetermined prohibition condition is not satisfied in a case where the erroneous acceleration operation precondition is satisfied while the driver's vehicle is traveling. The predetermined prohibition condition is set based on the relationship between the driver's vehicle and its external environment. Therefore, it is easy to reduce executing the acceleration suppression control unnecessarily while the driver's vehicle is traveling.

In the vehicle driving assistance device according to the present disclosure, the processor may be configured not to execute the acceleration suppression control in a case where the predetermined prohibition condition is satisfied when the traveling condition is satisfied and the erroneous acceleration operation precondition is satisfied.

With the present disclosure, the acceleration suppression control is not executed when the predetermined prohibition condition is satisfied while the driver's vehicle is traveling even if the erroneous acceleration operation precondition is satisfied. Therefore, it is easy to reduce executing the acceleration suppression control unnecessarily while the driver's vehicle is traveling.

In the vehicle driving assistance device according to the present disclosure, the predetermined prohibition condition may be a condition that an angle between a traveling direction of the driver's vehicle and a boundary closest to the driver's vehicle in the traveling direction of the driver's vehicle is larger than a predetermined permissible upper limit angle.

When the driver performs the erroneous acceleration operation while the driver's vehicle is traveling, the driver may erroneously operate a steering wheel in a panic due to abrupt acceleration of the driver's vehicle, and the driver's vehicle may travel toward the boundary.

In this case, the angle (boundary angle) between the traveling direction of the driver's vehicle and the boundary closest to the driver's vehicle in the traveling direction of the driver's vehicle is relatively large. Therefore, determination can be made that the acceleration of the driver's vehicle needs to be suppressed when the boundary angle is relatively large in a case where the erroneous acceleration operation precondition is satisfied while the driver's vehicle is traveling.

However, the driver performs the acceleration operation when trying to drive the driver's vehicle to cross a road. At this time, the traveling condition is satisfied and the erroneous acceleration operation precondition is also satisfied. Further, the driver's vehicle travels at a large angle with respect to the boundary closest to the driver's vehicle in the traveling direction. If the acceleration suppression control is executed through the determination that the acceleration of the driver's vehicle needs to be suppressed, it is difficult for the driver to drive the driver's vehicle as intended.

With the present disclosure, the predetermined prohibition condition is set to the condition that the angle between the traveling direction of the driver's vehicle and the boundary closest to the driver's vehicle in the traveling direction of the driver's vehicle is larger than the predetermined permissible upper limit angle. Therefore, it is possible to more appropriately determine whether the acceleration of the driver's vehicle needs to be suppressed.

In the vehicle driving assistance device according to the present disclosure, the processor may be configured to terminate the acceleration suppression control after the processor has started the acceleration suppression control, in a case where the driver's vehicle has entered an adjacent lane that is adjacent to a traveling lane of the driver's vehicle across a boundary of the traveling lane of the driver's vehicle and an angle between a traveling direction of the driver's vehicle and a boundary of the adjacent lane that is opposite to the traveling lane of the driver's vehicle is equal to or smaller than a predetermined adjacent lane boundary angle.

In a case where the driver changes lanes for the driver's vehicle, the acceleration suppression control is preferably terminated when the driver's vehicle enters the adjacent lane to complete the lane change even though the acceleration suppression control is started. When the driver's vehicle completes the lane change, the angle between the traveling direction of the driver's vehicle and the boundary of the adjacent lane that is opposite to the driver's vehicle traveling lane (traveling lane of the driver's vehicle) decreases. Therefore, determination can be made that the lane change for the driver's vehicle is completed when the angle between the traveling direction of the driver's vehicle and the boundary of the adjacent lane that is opposite to the driver's vehicle traveling lane (traveling lane of the driver's vehicle) decreases after the driver's vehicle has entered the adjacent lane.

According to the present disclosure, the acceleration suppression control is terminated in the case where the driver's vehicle has entered the adjacent lane across the boundary of the driver's vehicle traveling lane and the angle between the traveling direction of the driver's vehicle and the boundary of the adjacent lane that is opposite to the driver's vehicle traveling lane is equal to or smaller than the predetermined adjacent lane boundary angle. Therefore, the acceleration suppression control can be terminated at an appropriate timing.

In the vehicle driving assistance device according to the present disclosure, the predetermined prohibition condition may be a condition that an angle between the traveling direction of the driver's vehicle and the boundary of the traveling lane of the driver's vehicle is equal to or larger than a predetermined driver's vehicle traveling lane boundary angle. The predetermined adjacent lane boundary angle may be set to a value smaller than the predetermined driver's vehicle traveling lane boundary angle.

With the present disclosure, the predetermined adjacent lane boundary angle is set to a value smaller than the predetermined driver's vehicle traveling lane boundary angle. Therefore, it is possible to more accurately determine that the driver's vehicle has completed the lane change.

In the vehicle driving assistance device according to the present disclosure, the processor may be configured to terminate the acceleration suppression control after the processor has started the acceleration suppression control, in a case where the driver's vehicle has entered an adjacent lane that is adjacent to a traveling lane of the driver's vehicle across a boundary of the traveling lane of the driver's vehicle and an adjacent lane boundary crossing period is equal to or longer than a predetermined adjacent lane boundary crossing period. The adjacent lane boundary crossing period may be a period required for the driver's vehicle to cross a boundary of the adjacent lane that is opposite to the traveling lane of the driver's vehicle.

As described above, in the case where the driver changes lanes for the driver's vehicle, the acceleration suppression control is preferably terminated when the driver's vehicle enters the adjacent lane to complete the lane change even though the acceleration suppression control is started. When the driver's vehicle completes the lane change, the driver's vehicle travels along the adjacent lane. Therefore, the period required for the driver's vehicle to cross the boundary of the adjacent lane is a long period. Thus, determination can be made that the driver's vehicle has completed the lane change when the period required for the driver's vehicle to cross the boundary of the adjacent lane is a long period after the driver's vehicle has entered the adjacent lane.

With the present disclosure, the acceleration suppression control is terminated in the case where the driver's vehicle has entered the adjacent lane across the boundary of the driver's vehicle traveling lane and the period required for the driver's vehicle to cross the boundary of the adjacent lane that is opposite to the driver's vehicle traveling lane (adjacent lane boundary crossing period) is equal to or longer than the predetermined period (predetermined adjacent lane boundary crossing period). Therefore, the acceleration suppression control can be terminated at an appropriate timing.

In the vehicle driving assistance device according to the present disclosure, the processor may be configured to terminate the acceleration suppression control after the processor has started the acceleration suppression control, in a case where the driver's vehicle has entered an adjacent lane that is adjacent to a traveling lane of the driver's vehicle across a boundary of the traveling lane of the driver's vehicle and an adjacent lane traveling period is equal to or longer than a predetermined adjacent lane traveling period. The adjacent lane traveling period may be a traveling period in the adjacent lane after the driver's vehicle has entered the adjacent lane.

As described above, in the case where the driver changes lanes for the driver's vehicle, the acceleration suppression control is preferably terminated when the driver's vehicle enters the adjacent lane to complete the lane change even though the acceleration suppression control is started. When the driver's vehicle completes the lane change, the driver's vehicle travels along the adjacent lane. Therefore, the traveling period in the adjacent lane after the driver's vehicle has entered the adjacent lane is a long period. Thus, determination can be made that the driver's vehicle has completed the lane change when the traveling period in the adjacent lane after the driver's vehicle has entered the adjacent lane is a long period.

With the present disclosure, the acceleration suppression control is terminated in the case where the driver's vehicle has entered the adjacent lane across the boundary of the driver's vehicle traveling lane and the traveling period in the adjacent lane after the driver's vehicle has entered the adjacent lane (adjacent lane traveling period) is equal to or longer than the predetermined period (predetermined adjacent lane traveling period). Therefore, the acceleration suppression control can be terminated at an appropriate timing.

In the vehicle driving assistance device according to the present disclosure, the predetermined prohibition condition may be a condition that an object is present ahead of the driver's vehicle in a traveling lane of the driver's vehicle.

In the case where an object is present ahead of the driver's vehicle in the driver's vehicle traveling lane (traveling lane of the driver's vehicle), there is a strong possibility that the driver operates the steering wheel to drive the driver's vehicle around the object. If the acceleration suppression control is executed in such a situation due to the operation on the steering wheel, the driver cannot drive the driver's vehicle as intended.

With the present disclosure, the predetermined prohibition condition is set to the condition that an object is present ahead of the driver's vehicle in the traveling lane of the driver's vehicle. Therefore, it is possible to reduce the occurrence of the case where the driver cannot drive the driver's vehicle as intended due to the execution of the acceleration suppression control.

In the vehicle driving assistance device according to the present disclosure, the predetermined prohibition condition may be a condition that an object is present ahead of the driver's vehicle in a traveling lane of the driver's vehicle and a distance between the object and the driver's vehicle is equal to or shorter than a predetermined distance.

In the case where an object is present ahead of the driver's vehicle in the driver's vehicle traveling lane (traveling lane of the driver's vehicle), there is a strong possibility that the driver operates the steering wheel to drive the driver's vehicle around the object when the driver's vehicle approaches the object.

With the present disclosure, the predetermined prohibition condition is set to the condition that an object is present ahead of the driver's vehicle in the traveling lane of the driver's vehicle and the distance between the object and the driver's vehicle is equal to or shorter than the predetermined distance. Therefore, it is possible to reduce the occurrence of the case where the driver cannot drive the driver's vehicle as intended due to the execution of the acceleration suppression control.

In the vehicle driving assistance device according to the present disclosure, the predetermined prohibition condition may be a condition that another vehicle is traveling in an adjacent lane that is adjacent to a traveling lane of the driver's vehicle.

For example, if the driver's vehicle is traveling toward the adjacent lane when the acceleration suppression control is started through the determination that the erroneous acceleration operation is performed, the driver's vehicle is decelerated by the acceleration suppression control, and travels in the adjacent lane at a low speed. If another vehicle is traveling in the adjacent lane, the other vehicle may approach the driver's vehicle. This case is not preferable.

With the present disclosure, the predetermined prohibition condition is the condition that another vehicle is traveling in the adjacent lane that is adjacent to the traveling lane of the driver's vehicle. Therefore, it is possible to reduce the occurrence of the case where the other vehicle approaches the driver's vehicle.

In the vehicle driving assistance device according to the present disclosure, the predetermined prohibition condition may be a condition that a forward detection range of a peripheral information detection device of the driver's vehicle includes a blind spot in a range of an adjacent lane that is adjacent to a traveling lane of the driver's vehicle.

If the forward detection range of the peripheral information detection device of the driver's vehicle includes the blind spot in the range of the adjacent lane, the information on the situation in the adjacent lane cannot be acquired due to the blind spot. The execution of the acceleration suppression control is not preferable in the situation in which the information on the situation in the adjacent lane cannot be acquired.

With the present disclosure, the predetermined prohibition condition is set to the condition that the forward detection range of the peripheral information detection device of the driver's vehicle includes the blind spot in the range of the adjacent lane that is adjacent to the traveling lane of the driver's vehicle. Therefore, it is possible to reduce the execution of the acceleration suppression control when the blind spot is present in the adjacent lane.

In the vehicle driving assistance device according to the present disclosure, the predetermined prohibition condition may be a condition that a predicted period required for the driver's vehicle to cross a boundary of a traveling lane of the driver's vehicle is equal to or longer than a predetermined period.

If the driver performs the erroneous acceleration operation but the period required for the driver's vehicle to cross the boundary of the driver's vehicle traveling lane (traveling lane of the driver's vehicle) is long, there is little need to execute the acceleration suppression control.

With the present disclosure, the predetermined prohibition condition is set to the condition that the predicted period required for the driver's vehicle to cross the boundary of the traveling lane of the driver's vehicle is equal to or longer than the predetermined period. Therefore, it is possible to reduce the execution of the acceleration suppression control in the situation in which there is little need to execute the acceleration suppression control.

In the vehicle driving assistance device according to the present disclosure, the processor may be configured to execute the acceleration suppression control in a case where the driver's vehicle is stopped when the erroneous acceleration operation precondition is satisfied.

In the present disclosure, a non-transitory storage medium stores instructions that are executable by one or more processors and that cause the one or more processors to perform functions. The functions include executing acceleration suppression control for suppressing acceleration of a driver's vehicle in a case where a predetermined prohibition condition is not satisfied when an erroneous acceleration operation precondition is satisfied while a traveling condition is satisfied. The traveling condition is a condition for determining that the driver's vehicle is traveling. The erroneous acceleration operation precondition is a precondition for determining that an acceleration operation is erroneously performed. The acceleration operation is an operation performed by a driver of the driver's vehicle to request the acceleration of the driver's vehicle. The predetermined prohibition condition is based on a relationship between the driver's vehicle and an external environment of the driver's vehicle.

With the present disclosure, the acceleration suppression control is executed when the predetermined prohibition condition is not satisfied in a case where the erroneous acceleration operation precondition is satisfied while the driver's vehicle is traveling. The predetermined prohibition condition is set based on the relationship between the driver's vehicle and its external environment. Therefore, it is easy to reduce executing the acceleration suppression control unnecessarily while the driver's vehicle is traveling.

The constituent elements according to the present disclosure are not limited to those according to an embodiment of the present disclosure to be described later with reference to the drawings. Other objects, other features, and accompanying advantages of the present disclosure will easily be understood from the description of the embodiment of the present disclosure.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 10 is a flowchart showing a routine to be executed by the vehicle driving assistance device according to a modification of the embodiment of the present disclosure.

DETAILED DESCRIPTION OF EMBODIMENTS

Figure 1:
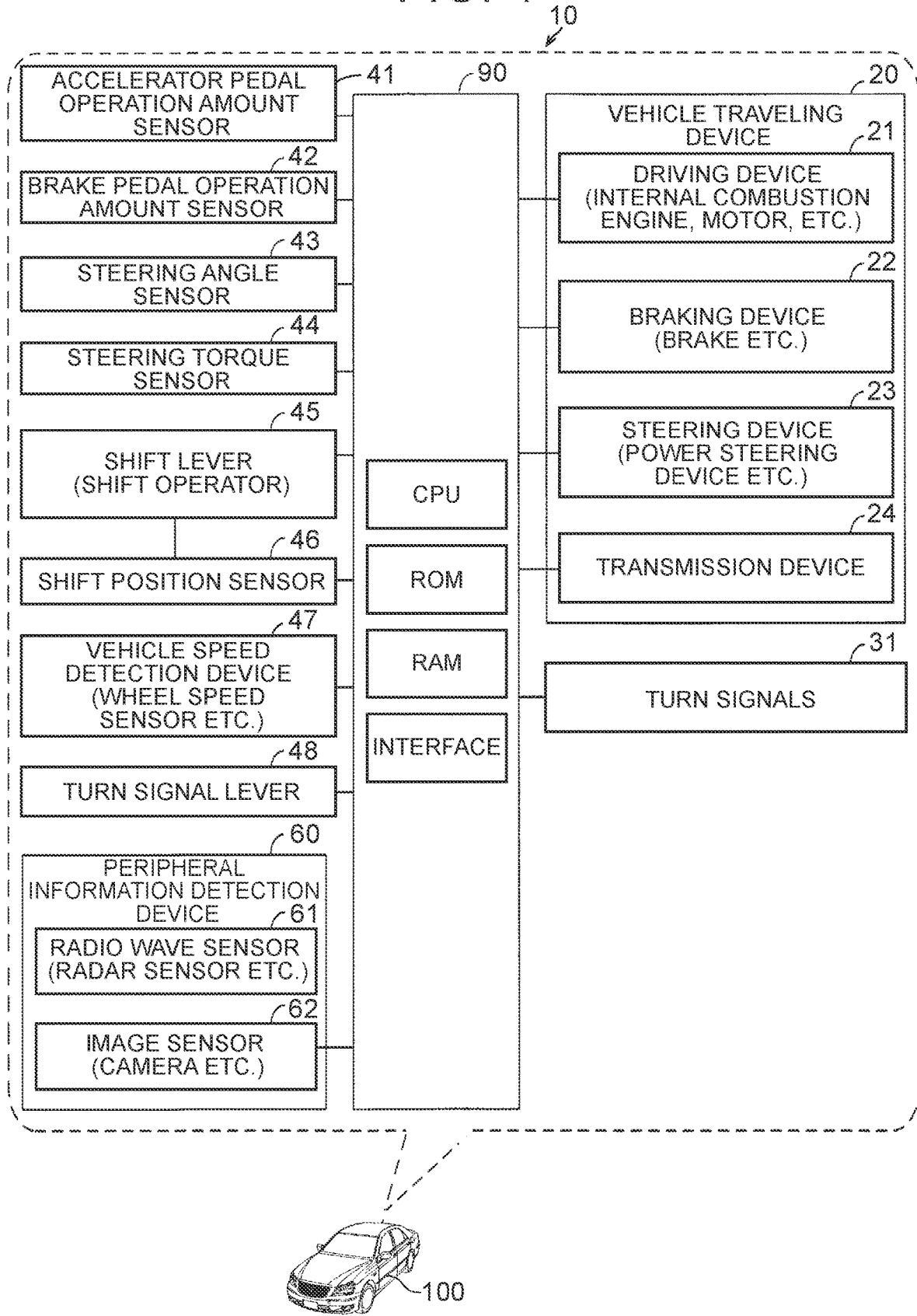
FIG. 1 is a diagram showing a vehicle driving assistance device according to an embodiment of the present disclosure and a vehicle (driver's vehicle) including the vehicle driving assistance device.

A vehicle driving assistance device according to an embodiment of the present disclosure will be described below with reference to the drawings. As shown in FIG. 1, a vehicle driving assistance device 10 according to the embodiment of the present disclosure is mounted on a vehicle (driver's vehicle 100).

The vehicle driving assistance device 10 includes an electronic control unit (ECU) 90 (processor 90). The ECU 90 includes a microcomputer as a main component. The ECU 90 includes a central processing unit (CPU), a read only memory (ROM), a random access memory (RAM), a non-volatile memory (not shown), and an interface. The CPU executes instructions (programs or routines) stored in the ROM to implement various functions.

Vehicle Traveling Device

The driver's vehicle 100 includes a vehicle traveling device 20. The vehicle traveling device 20 drives, brakes, steers, and changes shift positions of the driver's vehicle 100. In this example, the vehicle traveling device 20 includes a driving device 21, a braking device 22, a steering device 23, and a transmission device 24.

Driving Device

The driving device 21 outputs a driving force to be applied to the driver's vehicle 100 to cause the driver's vehicle 100 to travel. Examples of the driving device 21 include an internal combustion engine and/or a motor. The driving device 21 is electrically connected to the ECU 90. The ECU 90 can control the driving force to be output from the driving device 21 by controlling operation of the driving device 21.

Braking Device

The braking device 22 outputs a braking force to be applied to the driver's vehicle 100 to brake the driver's vehicle 100. Examples of the braking device 22 include a hydraulic brake. The braking device 22 is electrically connected to the ECU 90. The ECU 90 can control the braking force to be output from the braking device 22 by controlling operation of the braking device 22.

Steering Device

The steering device 23 outputs a steering force to be applied to the driver's vehicle 100 to steer the driver's vehicle 100. Examples of the steering device 23 include a power steering device. The steering device 23 is electrically connected to the ECU 90. The ECU 90 can control the steering force to be output from the steering device 23 by controlling operation of the steering device 23.

Transmission Device

The transmission device 24 switches whether to transmit the driving force to be output from the driving device 21 to driving wheels of the driver's vehicle 100, or switches whether to transmit the driving force to the driving wheels to move the driver's vehicle 100 forward or to transmit the driving force to the driving wheels to move the driver's vehicle 100 rearward. The transmission device 24 keeps the driver's vehicle 100 stopped by locking gears of the transmission device 24 so as not to rotate by engaging a pawl-like component (parking lock pawl) with the gears. Therefore, the transmission device 24 also functions as a stop keeping device for keeping the driver's vehicle 100 stopped.

The transmission device 24 operates in any one of a state in which the driving force is transmitted to the driving wheels to move the driver's vehicle 100 forward (drive-range state), a state in which the driving force is transmitted to the driving wheels to move the driver's vehicle 100 rearward (reverse-range state), a state in which the driving force is not transmitted to the driving wheels of the driver's vehicle 100 (neutral-range state), and a state in which the driver's vehicle 100 is kept stopped (parking-range state).

The transmission device 24 is electrically connected to the ECU 90. The ECU 90 can set the transmission device 24 to any one of the drive-range state, the reverse-range state, the neutral-range state, and the parking-range state by controlling operation of the transmission device 24.

Turn Signals

The driver's vehicle 100 includes turn signals 31. The turn signals 31 are devices for mainly indicating a turning direction of the driver's vehicle 100 to persons outside the driver's vehicle 100. The turn signals 31 are provided at the right front corner, the left front corner, the right rear corner, and the left rear corner of the driver's vehicle 100. The turn signals 31 are electrically connected to the ECU 90. The ECU 90 operates the turn signals 31 in response to an operation on a turn signal lever 48 described later.

Sensors and Other Devices

The driver's vehicle 100 further includes an accelerator pedal operation amount sensor 41, a brake pedal operation amount sensor 42, a steering angle sensor 43, a steering torque sensor 44, a shift position sensor 46, a vehicle speed detection device 47, the turn signal lever 48, and a peripheral information detection device 60.

Accelerator Pedal Operation Amount Sensor

The accelerator pedal operation amount sensor 41 detects an operation amount of an accelerator pedal of the driver's vehicle 100. The accelerator pedal operation amount sensor 41 is electrically connected to the ECU 90. The accelerator pedal operation amount sensor 41 transmits information on the detected operation amount of the accelerator pedal to the ECU 90. The ECU 90 acquires the operation amount of the accelerator pedal as an accelerator pedal operation amount AP based on the information.

The ECU 90 acquires a requested driving force Preq (requested driving torque) by calculation based on the accelerator pedal operation amount AP and a traveling speed of the driver's vehicle 100 (driver's vehicle speed) except for a case where acceleration suppression control described later is executed. The ECU 90 controls the operation of the driving device 21 to output the requested driving force Preq. When the acceleration suppression control described later is executed, the ECU 90 determines a driving force required to cause the driver's vehicle 100 to travel as desired by the acceleration suppression control, and controls the operation of the driving device 21 to output the driving force.

Brake Pedal Operation Amount Sensor

The brake pedal operation amount sensor 42 detects an operation amount of a brake pedal of the driver's vehicle 100. The brake pedal operation amount sensor 42 is electrically connected to the ECU 90. The brake pedal operation amount sensor 42 transmits information on the detected operation amount of the brake pedal to the ECU 90. The ECU 90 acquires the operation amount of the brake pedal as a brake pedal operation amount BP based on the information.

The ECU 90 acquires a requested braking force (requested braking torque) by calculation based on the brake pedal operation amount BP except for the case where the acceleration suppression control described later is executed. The ECU 90 controls the operation of the braking device 22 to output the requested braking force. When the acceleration suppression control described later is executed, the ECU 90 determines a braking force required to cause the driver's vehicle 100 to travel as desired by the acceleration suppression control, and controls the operation of the braking device 22 to output the braking force.

Steering Angle Sensor

The steering angle sensor 43 detects a rotation angle of a steering shaft of the driver's vehicle 100 with respect to a neutral position. The steering angle sensor 43 is electrically connected to the ECU 90. The steering angle sensor 43 transmits information on the detected rotation angle of the steering shaft to the ECU 90. The ECU 90 acquires the rotation angle of the steering shaft as a steering angle θ based on the information.

Steering Torque Sensor

The steering torque sensor 44 detects a torque input to the steering shaft by a driver DR of the driver's vehicle 100 via a steering wheel of the driver's vehicle 100. The steering torque sensor 44 is electrically connected to the ECU 90. The steering torque sensor 44 transmits information on the detected torque to the ECU 90. The ECU 90 acquires the torque input to the steering shaft by the driver DR via the steering wheel (driver input steering torque) based on the information.

The ECU 90 acquires a requested steering force (requested steering torque) based on the steering angle θ, the driver input steering torque, and the traveling speed of the driver's vehicle 100 (driver's vehicle speed), and controls the operation of the steering device 23 to output the requested steering torque from the steering device 23.

Shift Position Sensor

The shift position sensor 46 detects a set position of a shift lever 45 serving as a shift operator of the driver's vehicle 100. The shift lever 45 is a device to be operated by the driver DR of the driver's vehicle 100. The set position of the shift lever 45 that can be set by the driver DR is any one of a forward position (drive range), a rearward position (reverse range), a neutral position (neutral range), and a parking position (parking range). The shift position sensor 46 is electrically connected to the ECU 90. The shift position sensor 46 transmits a signal indicating the detected set position of the shift lever 45 to the ECU 90.

When the shift lever 45 is set to the drive range, the shift position sensor 46 transmits, to the ECU 90, a signal indicating that the set position of the shift lever 45 is the drive range. When the signal is received, the ECU 90 controls the operation of the transmission device 24 to bring the transmission device 24 into the drive-range state.

When the shift lever 45 is set to the reverse range, the shift position sensor 46 transmits, to the ECU 90, a signal indicating that the set position of the shift lever 45 is the reverse range. When the signal is received, the ECU 90 controls the operation of the transmission device 24 to bring the transmission device 24 into the reverse-range state.

When the shift lever 45 is set to the neutral range, the shift position sensor 46 transmits, to the ECU 90, a signal indicating that the set position of the shift lever 45 is the neutral range. When the signal is received, the ECU 90 controls the operation of the transmission device 24 to bring the transmission device 24 into the neutral-range state.

When the shift lever 45 is set to the parking range, the shift position sensor 46 transmits, to the ECU 90, a signal indicating that the set position of the shift lever 45 is the parking range. When the signal is received, the ECU 90 controls the operation of the transmission device 24 to bring the transmission device 24 into the parking-range state.

When the acceleration suppression control described later is executed, the ECU 90 controls the operation of the transmission device 24 (changes shift positions) as necessary to cause the driver's vehicle 100 to travel as desired by the acceleration suppression control.

Vehicle Speed Detection Device

The vehicle speed detection device 47 detects a traveling speed of the driver's vehicle 100. Examples of the vehicle speed detection device 47 include a wheel speed sensor. The vehicle speed detection device 47 is electrically connected to the ECU 90. The vehicle speed detection device 47 transmits information on the detected traveling speed of the driver's vehicle 100 to the ECU 90. The ECU 90 acquires the traveling speed of the driver's vehicle 100 (driver's vehicle speed V100) based on the information.

Turn Signal Lever

The turn signal lever 48 is a device to be operated by the driver DR to operate the turn signals 31. The turn signal lever 48 is electrically connected to the ECU 90. When the turn signal lever 48 is operated clockwise, the ECU 90 blinks the turn signals 31 provided at the right front corner and the right rear corner. When the turn signal lever 48 is operated counterclockwise, the ECU 90 blinks the turn signals 31 provided at the left front corner and the left rear corner. The ECU 90 can also blink all the turn signals 31 at predetermined time intervals. The blinking of all the turn signals 31 at the predetermined time intervals is hereinafter referred to as "hazard blinking".

Peripheral Information Detection Device

The peripheral information detection device 60 detects information around the driver's vehicle 100, and includes a radio wave sensor 61 and an image sensor 62 in this example.

Radio Wave Sensor

The radio wave sensor 61 detects information on an object around the driver's vehicle 100 by using radio waves. For example, the radio wave sensor 61 is at least one of a radar sensor (such as a millimeter wave radar), an acoustic wave sensor such as an ultrasonic sensor (clearance sonar), and an optical sensor such as a laser radar (light detection and ranging (LiDAR)). The radio wave sensor 61 is electrically connected to the ECU 90. The radio wave sensor 61 emits a radio wave, and receives the radio wave reflected by an object (reflected wave). The radio wave sensor 61 transmits information related to the emitted radio wave and the received radio wave (reflected wave) to the ECU 90. In other words, the radio wave sensor 61 detects an object present around the driver's vehicle 100, and transmits information related to the detected object to the ECU 90. The ECU 90 can acquire information related to the object present around the driver's vehicle 100 (peripheral detection information IS) based on the information (radio wave information IR or radio wave data). Examples of the object detected by using the radio wave sensor 61 include a vehicle, a wall, a bicycle, and a person.

Image Sensor

The image sensor 62 captures an image around the driver's vehicle 100. Examples of the image sensor include a camera. The image sensor 62 is electrically connected to the ECU 90. The image sensor 62 captures an image around the driver's vehicle 100, and transmits information related to the captured image to the ECU 90. The ECU 90 can acquire information related to the periphery of the driver's vehicle 100 (peripheral detection information IS) based on the information (image information IC or image data).

Outline of Operation of Vehicle Driving Assistance Device

Next, an outline of operation of the vehicle driving assistance device 10 will be described. The vehicle driving assistance device 10 executes acceleration suppression control for suppressing acceleration of the driver's vehicle 100 when an erroneous acceleration operation is performed as in a case where the driver DR forcefully depresses the accelerator pedal by mistake.

The vehicle driving assistance device 10 executes the acceleration suppression control when determination is made that an erroneous acceleration operation is performed. As a condition for determining that the erroneous acceleration operation is performed, it is conceivable to adopt a condition that the accelerator pedal operation amount AP increases at a high change rate.

If determination is made that the erroneous acceleration operation is performed because the accelerator pedal operation amount AP increases at a high change rate and the driver's vehicle 100 is traveling at the time of determination, the vehicle driving assistance device 10 may execute the acceleration suppression control in a scene in which the acceleration suppression control is not preferable, or in a scene in which there is little need to execute the acceleration suppression control.

In view of this, the vehicle driving assistance device 10 determines whether a predetermined prohibition condition C30 is satisfied when a traveling condition C20 is satisfied in a case where an erroneous acceleration operation precondition C10 is satisfied. When the vehicle driving assistance device 10 determines that the predetermined prohibition condition C30 is not satisfied, the vehicle driving assistance device 10 is configured to execute the acceleration suppression control. When the vehicle driving assistance device 10 determines that the predetermined prohibition condition C30 is satisfied, the vehicle driving assistance device 10 is configured not to execute the acceleration suppression control.

When the vehicle driving assistance device 10 determines that the traveling condition C20 is not satisfied in the case where the erroneous acceleration operation precondition C10 is satisfied (that is, the driver's vehicle 100 is stopped), the vehicle driving assistance device 10 is configured to execute the acceleration suppression control without determining whether the predetermined prohibition condition C30 is satisfied.

The traveling condition C20 is a condition for determining that the driver's vehicle 100 is traveling. In this example, the traveling condition C20 is a condition that the driver's vehicle speed V100 is higher than zero. In addition to the condition that the driver's vehicle speed V100 is higher than zero, the traveling condition C20 may include a condition that the driver's vehicle speed V100 is equal to or lower than a predetermined vehicle speed Vupper_limit higher than zero. In this example, the predetermined vehicle speed Vupper_limit is set to a relatively high speed.

The erroneous acceleration operation precondition C10 is a condition for determining that an erroneous acceleration operation is performed. In this example, the erroneous acceleration operation precondition C10 is a condition that the accelerator pedal operation amount AP is larger than a predetermined operation amount APth and a change rate Rap of the accelerator pedal operation amount AP at that time is higher than a predetermined change rate Rap_th. In addition to this condition, the erroneous acceleration operation precondition C10 may include one or more conditions out of a condition that the turn signals 31 are not operating, a condition that the brake pedal is not operated, and a condition that the brake pedal is being operated but an elapsed period from the start of the operation is longer than a predetermined period. In addition to these conditions, the erroneous acceleration operation precondition C10 may include a condition related to the steering angle θ and/or a condition related to the set position of the shift lever 45.

The acceleration operation is an operation for requesting acceleration of the driver's vehicle 100. In this example, the acceleration operation is an operation such as depression of the accelerator pedal. The vehicle driving assistance device 10 determines that the acceleration operation is performed when the accelerator pedal operation amount AP is larger than zero.

The erroneous acceleration operation is an erroneous operation on the accelerator pedal, such as forceful depression of the accelerator pedal by the driver DR by mistake.

In this example, the acceleration suppression control is control for executing a driving force limiting process or a braking process. In addition to these processes, the acceleration suppression control may be control for executing any one of a total of four processes additionally including a driving force reduction process and a shift-down process.

In the driving force limiting process, when the requested driving force Preq acquired based on the accelerator pedal operation amount AP and the driver's vehicle speed V100 is larger than a predetermined driving force Plimit, a driving force P to be applied from the driving device 21 to the driver's vehicle 100 is controlled to be the predetermined driving force Plimit. In other words, the driving force limiting process is control for limiting the driving force P to be applied from the driving device 21 to the driver's vehicle 100 to the predetermined driving force Plimit or smaller.

In the braking process, the driving force to be applied from the driving device 21 to the driver's vehicle 100 is set to zero, and the braking force is applied from the braking device 22 to the driver's vehicle 100.

In the driving force reduction process, the driving force to be applied from the driving device 21 to the driver's vehicle 100 is reduced from the driving force at that time regardless of the value of the accelerator pedal operation amount AP.

In the shift-down process, the braking force is applied to the driver's vehicle 100 by changing the gear ratio of the transmission device 24.

Predetermined Prohibition Condition

In this example, the predetermined prohibition condition C30 includes a prohibition boundary angle condition C31, an adjacent vehicle condition C32, a driver's vehicle traveling lane object condition C33, a blind spot condition C34, and a driver's vehicle traveling lane boundary crossing period condition C35. The vehicle driving assistance device 10 determines that the predetermined prohibition condition C30 is satisfied when at least one of the prohibition boundary angle condition C31, the adjacent vehicle condition C32, the driver's vehicle traveling lane object condition C33, the blind spot condition C34, and the driver's vehicle traveling lane boundary crossing period condition C35 is satisfied. In other words, the vehicle driving assistance device 10 determines that the predetermined prohibition condition C30 is not satisfied when none of the prohibition boundary angle condition C31, the adjacent vehicle condition C32, the driver's vehicle traveling lane object condition C33, the blind spot condition C34, and the driver's vehicle traveling lane boundary crossing period condition C35 is satisfied.

Prohibition Boundary Angle Condition

Figure 2A:
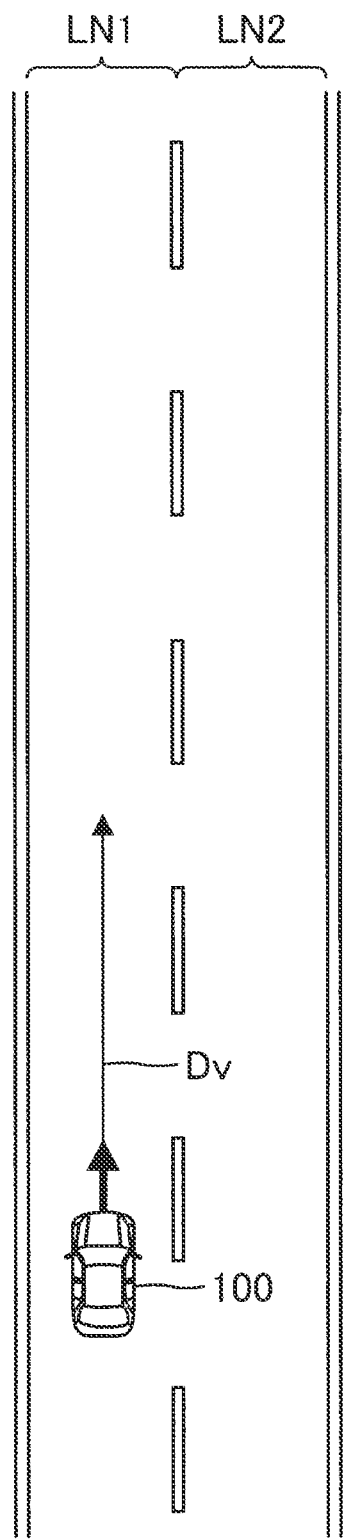
FIG. 2A is a diagram showing a scene in which the driver's vehicle is traveling and an erroneous acceleration operation is not performed.
Figure 2B:
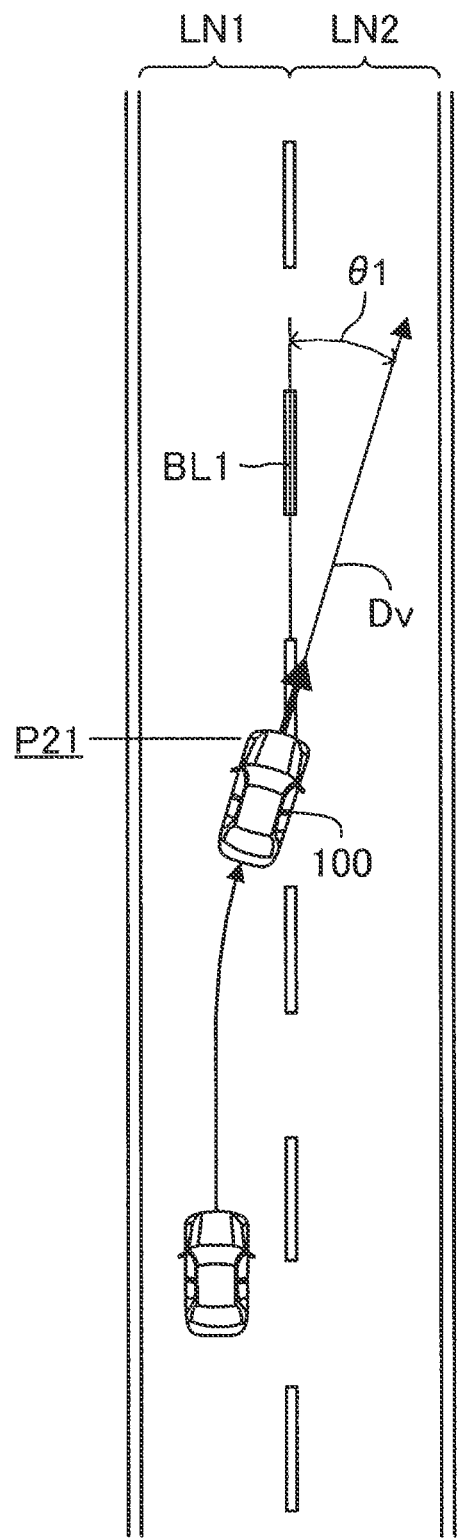
FIG. 2B is a diagram showing a scene in which the driver's vehicle is traveling and the erroneous acceleration operation is performed.

The prohibition boundary angle condition C31 will be described. When the driver DR performs an erroneous acceleration operation and the driver's vehicle 100 accelerates abruptly while the driver's vehicle 100 is traveling as shown in FIG. 2A, the driver DR may erroneously operate the steering wheel in a panic due to the abrupt acceleration. When the driver DR erroneously operates the steering wheel, a traveling direction Dv of the driver's vehicle 100 changes as shown in FIG. 2B (see a point P21). As a result, the driver's vehicle 100 may travel toward a boundary BL1. FIG. 2B shows a scene in which the driver's vehicle 100 is traveling toward the boundary BL1 (a right lane marking line defining a driver's vehicle traveling lane LN1, that is, a lane marking line between the driver's vehicle traveling lane LN1 and a lane LN2) closest to the driver's vehicle 100 in the traveling direction Dv.

At this time, an angle (boundary angle θ1) between the traveling direction Dv of the driver's vehicle 100 and the boundary BL1 (in the example shown in FIG. 2B, the right lane marking line defining the driver's vehicle traveling lane LN1) closest to the driver's vehicle 100 in the traveling direction Dv of the driver's vehicle 100 is relatively large (as compared with a case of normal lane change). Therefore, determination can be made that the acceleration of the driver's vehicle 100 needs to be suppressed when the boundary angle θ1 is relatively large in a case where the erroneous acceleration operation precondition C10 is satisfied while the driver's vehicle 100 is traveling (the traveling condition C20 is satisfied).

Figure 3:
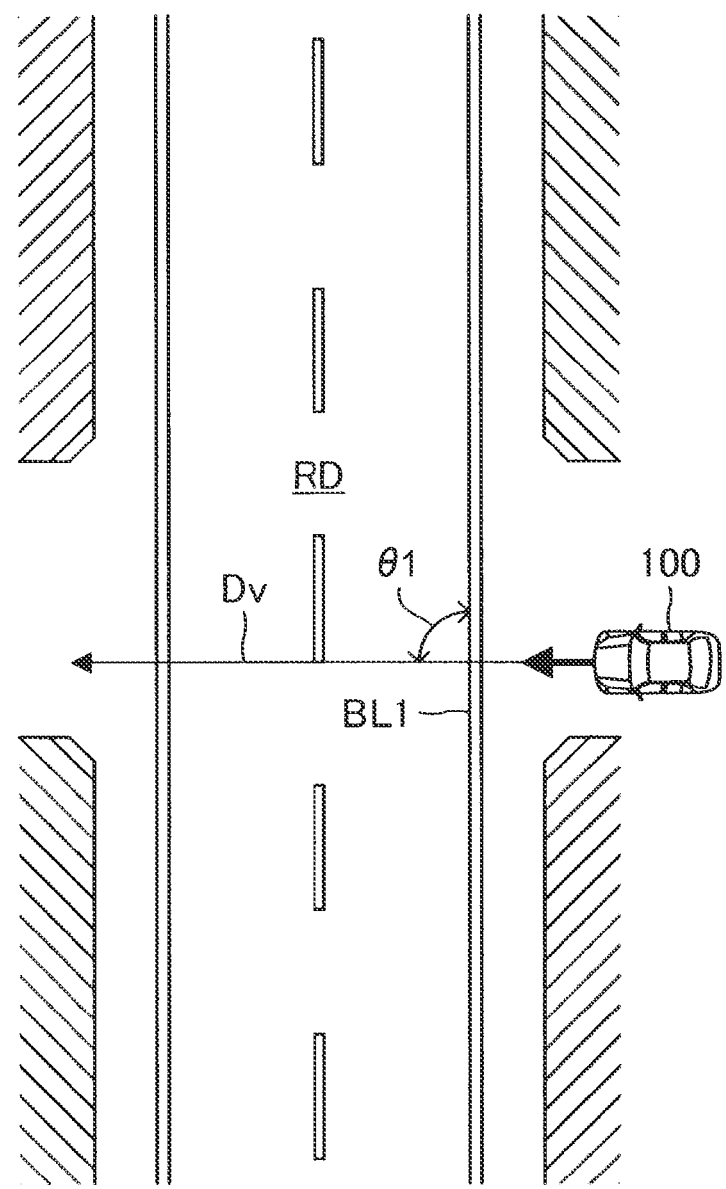
FIG. 3 is a diagram showing a scene in which the driver's vehicle is about to cross a road.

However, the driver DR may forcefully depress the accelerator pedal when trying to drive the driver's vehicle 100 to cross a road RD as shown in FIG. 3. At this time, the traveling condition C20 is satisfied and the erroneous acceleration operation precondition C10 is also satisfied. Further, the driver's vehicle 100 travels at a large angle with respect to the boundary BL1 closest to the driver's vehicle 100 in the traveling direction Dv. If the acceleration suppression control is executed through the determination that the acceleration of the driver's vehicle 100 needs to be suppressed, it is difficult for the driver DR to drive the driver's vehicle 100 as intended.

If the driver DR performs an erroneous acceleration operation but does not erroneously operate the steering wheel at that time, the driver's vehicle 100 travels along the driver's vehicle traveling lane LN1. In such a situation, there is little need to execute the acceleration suppression control at that time. In other words, if the erroneous acceleration operation is performed but the boundary angle θ1 is very small, there is little need to execute the acceleration suppression control at that time.

In view of the above, the prohibition boundary angle condition C31 in this example is set to a condition that the boundary angle θ1 is outside a predetermined permissible angle range Rθ. As a result, the acceleration suppression control is not executed when the erroneous acceleration operation precondition C10 is satisfied while the traveling condition C20 is satisfied but the boundary angle θ1 is relatively large or very small.

The upper limit value of the predetermined permissible angle range Rθ is a predetermined permissible upper limit angle θupper_limit (predetermined driver's vehicle traveling lane boundary angle). The lower limit value of the predetermined permissible angle range Rθ is a predetermined permissible lower limit angle θlower_limit. The vehicle driving assistance device 10 acquires the boundary angle θ1 by using the peripheral detection information IS.

Adjacent Vehicle Condition

Next, the adjacent vehicle condition C32 will be described. In a case where the driver's vehicle 100 is traveling along the road when the driver DR erroneously operates the steering wheel in a panic due to abrupt acceleration of the driver's vehicle 100 caused by an erroneous acceleration operation of the driver DR during traveling of the driver's vehicle 100, the driver's vehicle 100 may travel toward the boundary BL1 of the driver's vehicle traveling lane LN1.

Figure 4A:
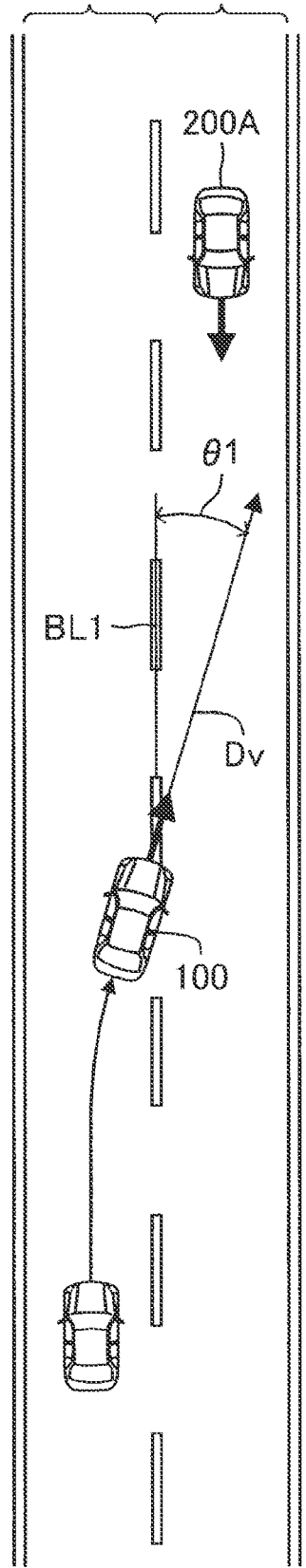
FIG. 4A is a diagram showing a scene in which an oncoming vehicle traveling in an oncoming lane is present ahead of the driver's vehicle.

At this time, as shown in FIG. 4A, the adjacent lane LN2 may be present in the traveling direction Dv of the driver's vehicle 100 and the adjacent lane LN2 may be an oncoming lane. A vehicle traveling in the oncoming lane (oncoming vehicle 200A) may be present ahead of the driver's vehicle 100. If the acceleration suppression control is executed in such a situation, the driver's vehicle 100 enters the adjacent lane LN2 (oncoming lane) while being decelerated by the acceleration suppression control, travels in the adjacent lane LN2 at a low speed, or stops in the adjacent lane LN2. This case is not preferable because the oncoming vehicle 200A may approach the driver's vehicle 100.

Figure 4B:
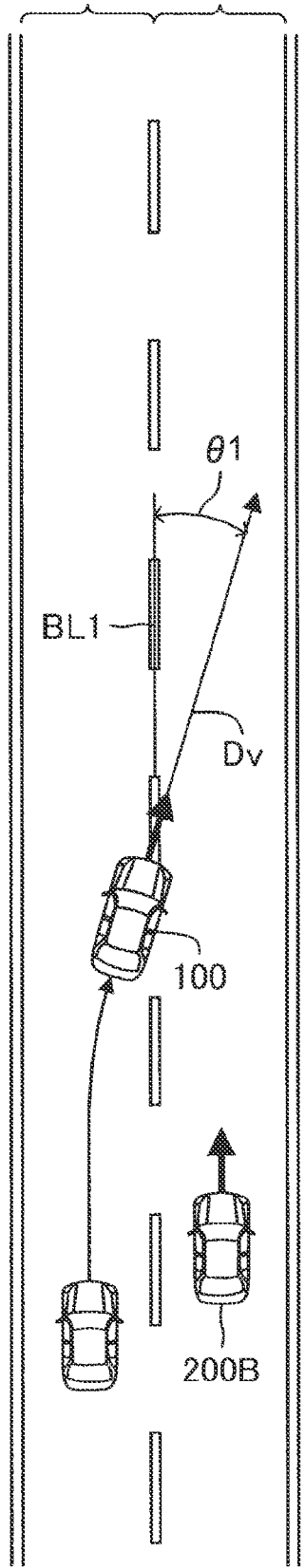
FIG. 4B is a diagram showing a scene in which another vehicle traveling in another through lane is present behind the driver's vehicle.

As shown in FIG. 4B, the adjacent lane LN2 may be present in the traveling direction Dv of the driver's vehicle 100 and the adjacent lane LN2 may be another through lane. A vehicle traveling in the other through lane (rear-side vehicle 200B) may be present behind the driver's vehicle 100. If the acceleration suppression control is executed in such a situation, the driver's vehicle 100 enters the adjacent lane LN2 (other through lane) while being decelerated by the acceleration suppression control, travels in the adjacent lane LN2 at a low speed, or stops in the adjacent lane LN2. This case is not preferable because the rear-side vehicle 200B may approach the driver's vehicle 100.

In view of the above, the adjacent vehicle condition C32 in this example is set to a condition that, in a case where the adjacent lane LN2 present in the traveling direction Dv of the driver's vehicle 100 is an oncoming lane, a vehicle traveling in the oncoming lane (oncoming vehicle 200A) is present ahead of the driver's vehicle 100 and a predicted reach period TTC for the oncoming vehicle 200A is equal to or shorter than a predetermined predicted reach period TTCth. Alternatively, the adjacent vehicle condition C32 is set to a condition that, in a case where the adjacent lane LN2 present in the traveling direction Dv of the driver's vehicle 100 is another through lane, a vehicle traveling in the other through lane (rear-side vehicle 200B) is present behind the driver's vehicle 100 and the predicted reach period TTC for the rear-side vehicle 200B is equal to or shorter than the predetermined predicted reach period TTCth. As a result, the acceleration suppression control is not executed when the erroneous acceleration operation precondition C10 is satisfied while the traveling condition C20 is satisfied but the oncoming vehicle 200A or the rear-side vehicle 200B traveling in the adjacent lane LN2 may approach the driver's vehicle 100 if the acceleration suppression control is executed.

The predicted reach period TTC for the oncoming vehicle 200A is a predicted period required for the driver's vehicle 100 to reach a point close to the oncoming vehicle 200A at a distance shorter than a predetermined distance when the driver's vehicle 100 travels while keeping the vehicle speed V100 and the steering angle θ at that time. The vehicle driving assistance device 10 acquires the predicted reach period TTC by calculation based on a distance between the driver's vehicle 100 and the oncoming vehicle 200A, a relative speed between the driver's vehicle 100 and the oncoming vehicle 200A, and the steering angle θ. The vehicle driving assistance device 10 acquires the distance between the driver's vehicle 100 and the oncoming vehicle 200A and the relative speed between the driver's vehicle 100 and the oncoming vehicle 200A by using the peripheral detection information IS or the like.

The predicted reach period TTC for the rear-side vehicle 200B is a predicted period required for the driver's vehicle 100 to reach a point close to the rear-side vehicle 200B at a distance shorter than a predetermined distance when the driver's vehicle 100 travels while keeping the vehicle speed V100 and the steering angle θ at that time. The vehicle driving assistance device 10 acquires the predicted reach period TTC by calculation based on a distance between the driver's vehicle 100 and the rear-side vehicle 200B, a relative speed between the driver's vehicle 100 and the rear-side vehicle 200B, and the steering angle θ. The vehicle driving assistance device 10 acquires the distance between the driver's vehicle 100 and the rear-side vehicle 200B and the relative speed between the driver's vehicle 100 and the rear-side vehicle 200B by using the peripheral detection information IS or the like.

The vehicle driving assistance device 10 determines whether the adjacent lane LN2 present in the traveling direction Dv of the driver's vehicle 100 is either one of an oncoming lane and another through lane based on the peripheral detection information IS.

Driver's Vehicle Traveling Lane Object Condition

Figure 5:
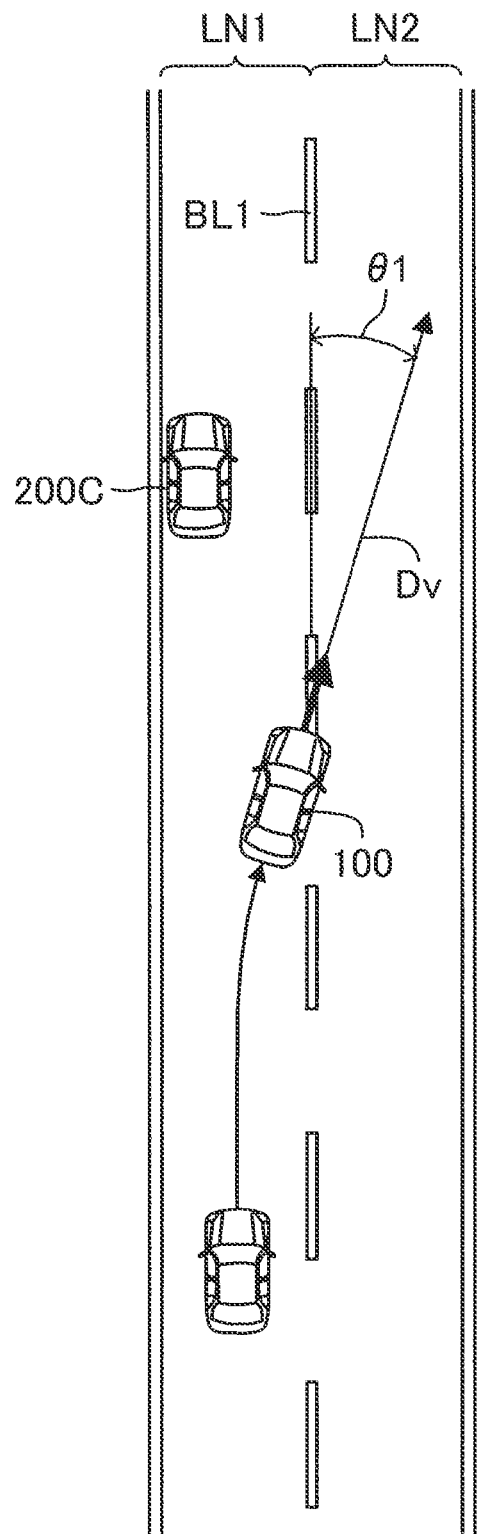
FIG. 5 is a diagram showing a scene in which another vehicle stopped in a driver's vehicle traveling lane is present ahead of the driver's vehicle.

Next, the driver's vehicle traveling lane object condition C33 will be described. As shown in FIG. 5, an object such as a vehicle (driver's vehicle traveling lane object 200C) may be stopped on the side of the driver's vehicle traveling lane LN1 ahead of the driver's vehicle 100, or an object such as a pedestrian or a bicycle (driver's vehicle traveling lane object 200C) may be moving along the side of the driver's vehicle traveling lane LN1 ahead of the driver's vehicle 100 in a direction identical or opposite to the traveling direction Dv of the driver's vehicle 100. In this case, the driver DR may operate the steering wheel to turn the driver's vehicle 100 in order that the driver's vehicle 100 travel around the driver's vehicle traveling lane object 200C. FIG. 5 shows a scene in which a vehicle (driver's vehicle traveling lane object 200C) is stopped on the left side of the driver's vehicle traveling lane LN1 ahead of the driver's vehicle 100.

When the driver DR operates the steering wheel to turn the driver's vehicle 100 in order that the driver's vehicle 100 travel around the driver's vehicle traveling lane object 200C, the driver's vehicle 100 travels toward the boundary BL1 of the driver's vehicle traveling lane LN1. If the driver DR performs an operation that satisfies the erroneous acceleration operation precondition C10 and the acceleration suppression control is therefore executed through the determination that the acceleration of the driver's vehicle 100 needs to be suppressed, it is difficult for the driver DR to drive the driver's vehicle 100 as intended.

In view of the above, the driver's vehicle traveling lane object condition C33 in this example is set to a condition that the driver's vehicle traveling lane object 200C is stationary on the side of the driver's vehicle traveling lane LN1 ahead of the driver's vehicle 100, moving along the side of the driver's vehicle traveling lane LN1 ahead of the driver's vehicle 100 in a direction identical to the traveling direction Dv of the driver's vehicle 100, or moving along the side of the driver's vehicle traveling lane LN1 ahead of the driver's vehicle 100 in a direction opposite to the traveling direction Dv of the driver's vehicle 100, and the predicted reach period TTC for the driver's vehicle traveling lane object 200C is equal to or shorter than the predetermined predicted reach period TTCth. As a result, the acceleration suppression control is not executed when the erroneous acceleration operation precondition C10 is satisfied while the traveling condition C20 is satisfied but an object such as a vehicle is present on the side of the driver's vehicle traveling lane LN1 ahead of the driver's vehicle 100. The driver's vehicle traveling lane object condition C33 may be a condition that the distance between the driver's vehicle traveling lane object 200C and the driver's vehicle is equal to or shorter than a predetermined distance in place of the condition that the predicted reach period TTC for the driver's vehicle traveling lane object 200C is equal to or shorter than the predetermined predicted reach period TTCth.

The predicted reach period TTC for the driver's vehicle traveling lane object 200C is a predicted period required for the driver's vehicle 100 to reach a point close to the driver's vehicle traveling lane object 200C at a distance shorter than a predetermined distance when the driver's vehicle 100 travels while keeping the vehicle speed V100 and the steering angle θ at that time. The vehicle driving assistance device 10 acquires the predicted reach period TTC by calculation based on a distance between the driver's vehicle 100 and the driver's vehicle traveling lane object 200C, a relative speed between the driver's vehicle 100 and the driver's vehicle traveling lane object 200C, and the steering angle θ. The vehicle driving assistance device 10 acquires the distance between the driver's vehicle 100 and the driver's vehicle traveling lane object 200C and the relative speed between the driver's vehicle 100 and the driver's vehicle traveling lane object 200C by using the peripheral detection information IS or the like.

The vehicle driving assistance device 10 determines whether the driver's vehicle traveling lane object 200C is present based on the peripheral detection information IS.

Blind Spot Condition

Next, the blind spot condition C34 will be described. As described above, when the driver DR erroneously operates the steering wheel in a panic due to abrupt acceleration of the driver's vehicle 100 caused by an erroneous acceleration operation of the driver DR during traveling of the driver's vehicle 100, the driver's vehicle 100 may travel toward the boundary BL1 of the driver's vehicle traveling lane LN1.

Figure 6:
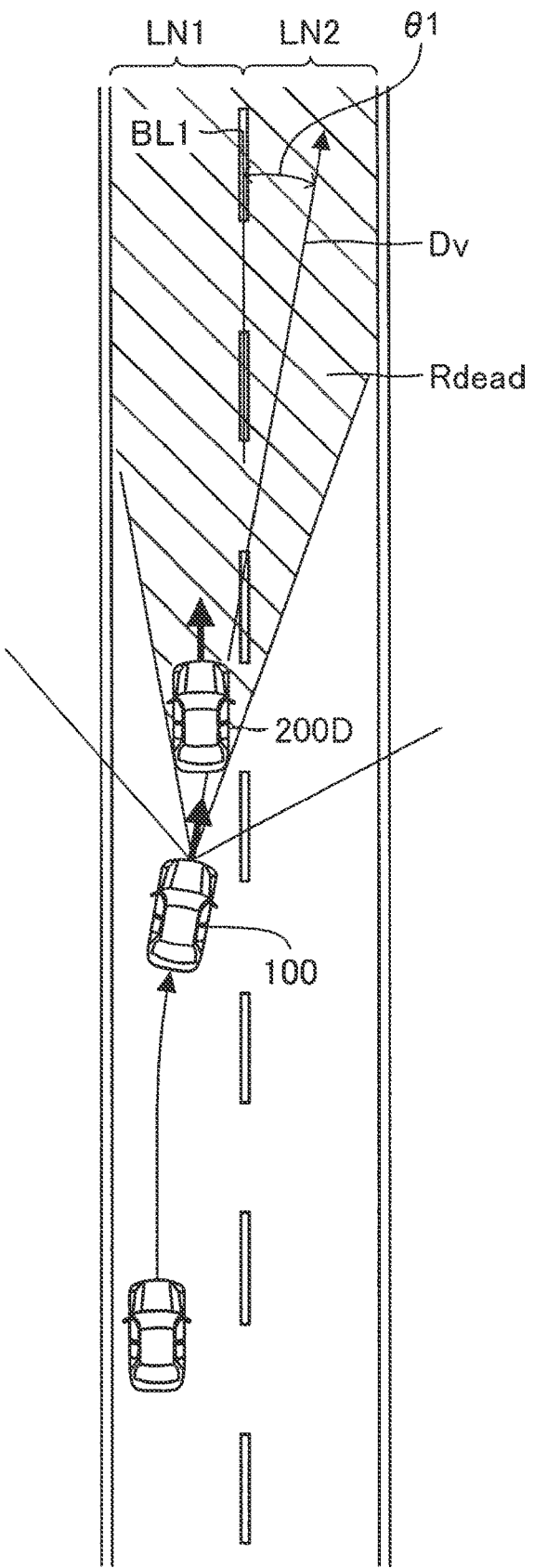
FIG. 6 is a diagram showing a scene in which a preceding vehicle is present and a blind spot is present in a detection range of a peripheral information detection device of the vehicle driving assistance device due to the preceding vehicle.

If a vehicle traveling in the driver's vehicle traveling lane LN1 (preceding vehicle 200D) is present ahead of the driver's vehicle 100 as shown in FIG. 6, a part of a detection range (forward detection range) of the peripheral information detection device 60 may be obstructed by the preceding vehicle 200D to become a blind spot. If the acceleration suppression control is executed in such a situation, the driver's vehicle 100 enters the adjacent lane LN2 (in the example shown in FIG. 6, an oncoming lane) while being decelerated by the acceleration suppression control, travels in the adjacent lane LN2 at a low speed, or stops in the adjacent lane LN2 though the situation in a blind range Rdead ahead of the driver's vehicle 100 cannot be acquired from the peripheral detection information IS. Therefore, such a situation is not preferable.

In view of the above, the blind spot condition C34 in this example is set to a condition that, in a case where the adjacent lane LN2 is present, a blind spot of the peripheral information detection device 60 is present in the adjacent lane LN2 within a range from the driver's vehicle 100 to a point at a predetermined distance Dth ahead of the driver's vehicle 100. As a result, the acceleration suppression control is not executed when the erroneous acceleration operation precondition C10 is satisfied while the traveling condition C20 is satisfied but the blind spot of the peripheral information detection device 60 is present in the adjacent lane LN2.

The vehicle driving assistance device 10 determines, based on the peripheral detection information IS, whether the blind spot of the peripheral information detection device 60 is present in the adjacent lane LN2 and whether the blind spot is present in the adjacent lane LN2 within the range from the driver's vehicle 100 to the point at the predetermined distance Dth ahead of the driver's vehicle 100.

Driver's Vehicle Traveling Lane Boundary Crossing Period Condition

Next, the driver's vehicle traveling lane boundary crossing period condition C35 will be described. As described above, when the driver DR erroneously operates the steering wheel in a panic due to abrupt acceleration of the driver's vehicle 100 caused by an erroneous acceleration operation of the driver DR during traveling of the driver's vehicle 100, the driver's vehicle 100 may travel toward the boundary BL1 of the driver's vehicle traveling lane LN1.

If the period required for the driver's vehicle 100 to cross the boundary BL1 of the driver's vehicle traveling lane LN1 (driver's vehicle traveling lane boundary crossing period T1) is relatively long, there is little need to execute the acceleration suppression control at that time.

In view of the above, the driver's vehicle traveling lane boundary crossing period condition C35 in this example is set to a condition that the driver's vehicle traveling lane boundary crossing period T1 is equal to or longer than a predetermined driver's vehicle traveling lane boundary crossing period T1$th$. As a result, the acceleration suppression control is not executed when the erroneous acceleration operation precondition C10 is satisfied while the traveling condition C20 is satisfied but the period required for the driver's vehicle 100 to cross the boundary BL1 of the driver's vehicle traveling lane LN1 (driver's vehicle traveling lane boundary crossing period T1) is relatively long and there is little need to execute the acceleration suppression control at that time.

The vehicle driving assistance device 10 acquires the driver's vehicle traveling lane boundary crossing period T1 based on the peripheral detection information IS.

Termination Condition

In this example, a condition for terminating the acceleration suppression control (termination condition C40) after the start of the acceleration suppression control is set as well. The termination condition C40 includes an adjacent lane boundary angle condition C41, an adjacent lane boundary crossing period condition C42, an adjacent lane traveling period condition C43, and an accelerator pedal operation amount condition C44.

Adjacent Lane Boundary Angle Condition

Figure 7A:
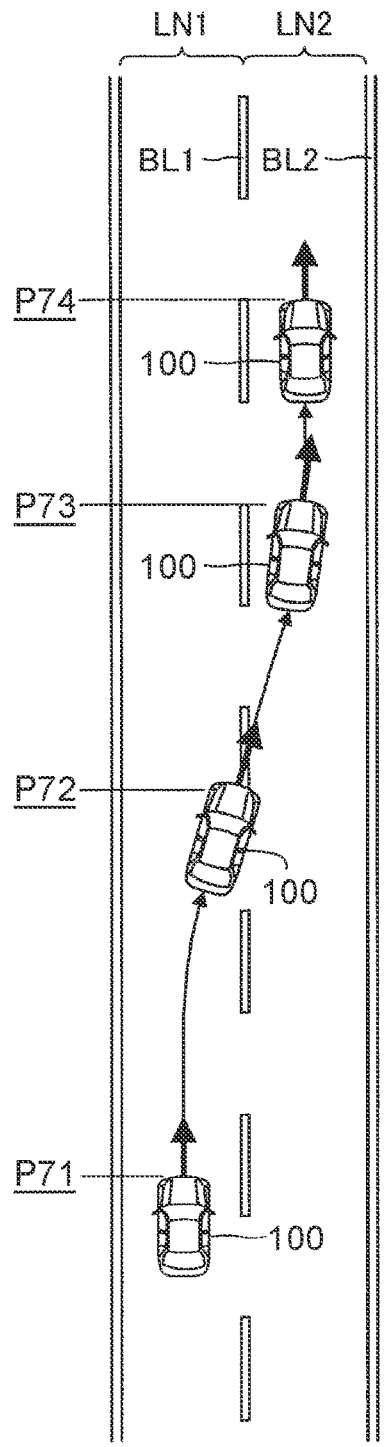
FIG. 7A is a diagram showing how the driver's vehicle changes lanes.
Figure 7B:
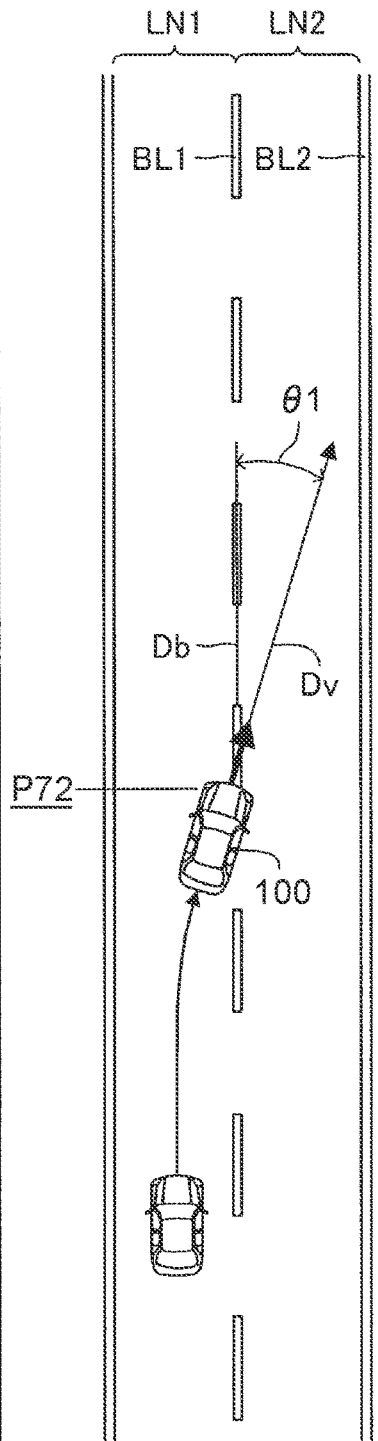
FIG. 7B is a diagram showing a scene in which the driver's vehicle is changing lanes and is about to cross a driver's vehicle traveling lane boundary.

The adjacent lane boundary angle condition C41 will be described. When the driver DR changes lanes for the driver's vehicle 100, the driver's vehicle 100 travels as shown in FIG. 7A. As shown in FIG. 7B, when the driver's vehicle 100 has traveled from a point P71 to a point P72, the driver's vehicle 100 is traveling and the boundary angle θ1 is within the predetermined permissible angle range Rθ. When the driver DR performs an operation that satisfies the erroneous acceleration operation precondition C10, the vehicle driving assistance device 10 starts the acceleration suppression control. If the acceleration suppression control is continued, the acceleration of the driver's vehicle 100 is suppressed continuously. Therefore, such a situation is not preferable.

Figure 7C:
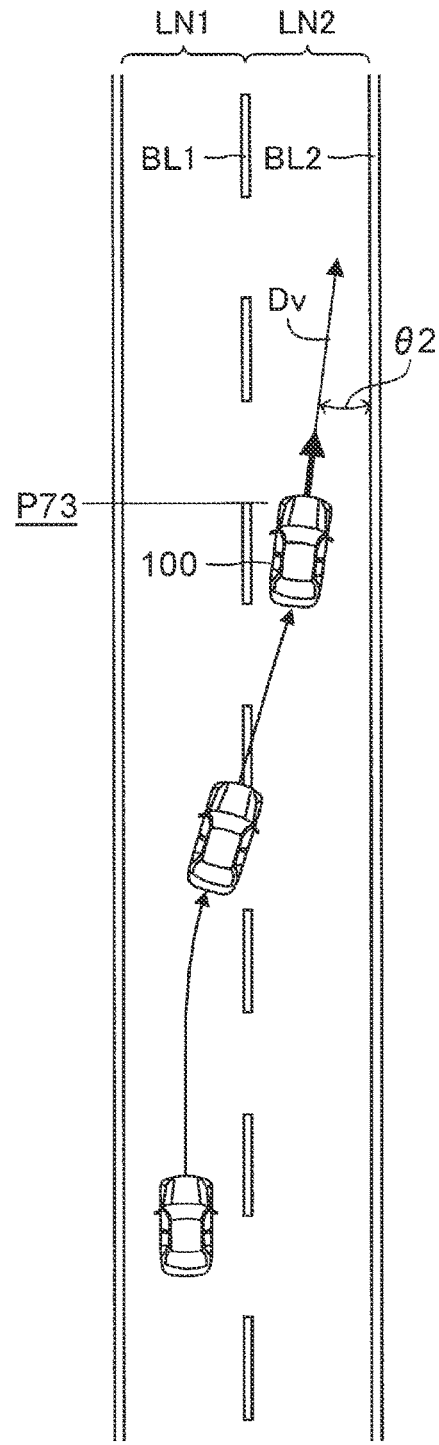
FIG. 7C is a diagram showing a scene in which the driver's vehicle is changing lanes and enters an adjacent lane across the driver's vehicle traveling lane boundary.

If the driver DR is changing lanes for the driver's vehicle 100, as shown in FIG. 7C, an angle (adjacent lane boundary angle θ2) between the traveling direction Dv of the driver's vehicle 100 and a boundary BL2 of the adjacent lane LN2 present in the traveling direction Dv of the driver's vehicle 100 decreases when the driver's vehicle 100 has traveled to a point P73. Therefore, determination can be made that the lane change for the driver's vehicle 100 is completed when the driver's vehicle 100 has entered the adjacent lane LN2 across the boundary BL1 of the driver's vehicle traveling lane LN1 and the adjacent lane boundary angle θ2 is a relatively small angle.

In view of the above, the adjacent lane boundary angle condition C41 in this example is set to a condition that the driver's vehicle 100 has entered the adjacent lane LN2 across the boundary BL1 of the driver's vehicle traveling lane LN1 and the adjacent lane boundary angle θ2 is equal to or smaller than a predetermined adjacent lane boundary angle θ2$th$. As a result, the acceleration suppression control can be terminated when the lane change for the driver's vehicle 100 is completed. The predetermined adjacent lane boundary angle θ2$th$ may be smaller than the predetermined permissible upper limit angle θupper_limit (predetermined driver's vehicle traveling lane boundary angle).

The vehicle driving assistance device 10 determines whether the driver's vehicle 100 has entered the adjacent lane LN2 based on the peripheral detection information IS.

The vehicle driving assistance device 10 acquires the adjacent lane boundary angle θ2 based on the peripheral detection information IS.

Adjacent Lane Boundary Crossing Period Condition

Next, the adjacent lane boundary crossing period condition C42 will be described. As described above, if the driver DR is changing lanes for the driver's vehicle 100, as shown in FIG. 7C, the adjacent lane boundary angle θ2 decreases when the driver's vehicle 100 has traveled to the point P73. Therefore, the period required for the driver's vehicle 100 to cross the boundary BL2 of the adjacent lane LN2 present ahead in the traveling direction Dv (adjacent lane boundary crossing period T2) increases. Thus, determination can be made that the lane change for the driver's vehicle 100 is completed when the driver's vehicle 100 has entered the adjacent lane LN2 across the boundary BL1 of the driver's vehicle traveling lane LN1 and the adjacent lane boundary crossing period T2 is a relatively long period.

In view of the above, the adjacent lane boundary crossing period condition C42 in this example is set to a condition that the driver's vehicle 100 has entered the adjacent lane LN2 across the boundary BL1 of the driver's vehicle traveling lane LN1 and the adjacent lane boundary crossing period T2 is equal to or longer than a predetermined adjacent lane boundary crossing period T2th. As a result, the acceleration suppression control can be terminated when the lane change for the driver's vehicle 100 is completed.

The vehicle driving assistance device 10 acquires the adjacent lane boundary crossing period T2 based on the peripheral detection information IS or the like.

Adjacent Lane Traveling Period Condition

Next, the adjacent lane traveling period condition C43 will be described. When the lane change for the driver's vehicle 100 is completed, the driver's vehicle 100 is expected to travel in the adjacent lane LN2 for a relatively long period after entering the adjacent lane LN2. Therefore, determination can be made that the lane change for the driver's vehicle 100 is completed when the traveling period in the adjacent lane LN2 (adjacent lane traveling period T3) is a relatively long period after the driver's vehicle 100 has entered the adjacent lane LN2 across the boundary BL1 of the driver's vehicle traveling lane LN1.

In view of the above, the adjacent lane traveling period condition C43 in this example is set to a condition that the adjacent lane traveling period T3 is equal to or longer than a predetermined adjacent lane traveling period T3th. As a result, the acceleration suppression control can be terminated when the lane change for the driver's vehicle 100 is completed.

The vehicle driving assistance device 10 acquires the adjacent lane traveling period T3 based on the peripheral detection information IS or the like.

Accelerator Pedal Operation Amount Condition

Next, the accelerator pedal operation amount condition C44 will be described. If the accelerator pedal operation amount AP decreases after the start of the acceleration suppression control, determination can be made that the situation in which the driver DR is performing the erroneous acceleration operation has been resolved.

In view of the above, the accelerator pedal operation amount condition C44 in this example is set to a condition that the accelerator pedal operation amount AP is equal to or smaller than a predetermined cancellation operation amount APcancel. As a result, the acceleration suppression control can be terminated when the erroneous acceleration operation is no longer performed.

When executing the acceleration suppression control, the vehicle driving assistance device 10 executes the driving force limiting process or the braking process as the acceleration suppression control, but may switch the process to be executed as the acceleration suppression control from the driving force limiting process to the braking process depending on the situation of the driver's vehicle 100.

More specifically, when the acceleration suppression control is started while the driver's vehicle 100 is traveling along the road, the vehicle driving assistance device 10 may execute the driving force limiting process until the driver's vehicle 100 crosses the boundary BL1 of the driver's vehicle traveling lane LN1, and may execute the braking process after the driver's vehicle 100 has crossed the boundary BL1 of the driver's vehicle traveling lane LN1.

Effects

According to the vehicle driving assistance device 10, the acceleration suppression control is not executed as long as the predetermined prohibition condition C30 is satisfied even if the erroneous acceleration operation precondition C10 is satisfied while the driver's vehicle 100 is traveling. The predetermined prohibition condition C30 is set based on the relationship between the driver's vehicle 100 and its external environment. Therefore, it is possible to reduce executing the acceleration suppression control unnecessarily while the driver's vehicle 100 is traveling.

Specific Operation of Vehicle Driving Assistance Device

Next, specific operation of the vehicle driving assistance device 10 will be described. The CPU of the ECU 90 of the vehicle driving assistance device 10 executes a routine shown in FIG. 8 in a predetermined calculation cycle. At a predetermined timing, the CPU starts a process from Step S800 in FIG. 8, and advances the process to Step S805 to determine whether the value of an acceleration suppression execution flag X1 is "0". The acceleration suppression execution flag X1 indicates whether the acceleration suppression control is being executed. The acceleration suppression execution flag X1 is set to "1" when the acceleration suppression control is being executed. The acceleration suppression execution flag X1 is set to "0" when the acceleration suppression control is not being executed.

When the CPU determines "Yes" in Step S805, the CPU advances the process to Step S810 to determine whether the erroneous acceleration operation precondition C10 is satisfied.

When the CPU determines "Yes" in Step S810, the CPU advances the process to Step S815 to determine whether at least one condition in the predetermined prohibition condition C30 is satisfied.

When the CPU determines "No" in Step S815, the CPU advances the process to Step S820 to start the acceleration suppression control. Next, the CPU advances the process to Step S825 to set the value of the acceleration suppression execution flag X1 to "1". Next, the CPU advances the process to Step S895 to temporarily terminate this routine.

When the CPU determines "Yes" in Step S815, the CPU directly advances the process to Step S895 to temporarily terminate this routine.

When the CPU determines "No" in Step S810, the CPU directly advances the process to Step S895 to temporarily terminate this routine.

When the CPU determines "No" in Step S805, the CPU advances the process to Step S830 to continue the acceleration suppression control. Next, the CPU advances the process to Step S895 to temporarily terminate this routine.

Figure 8:
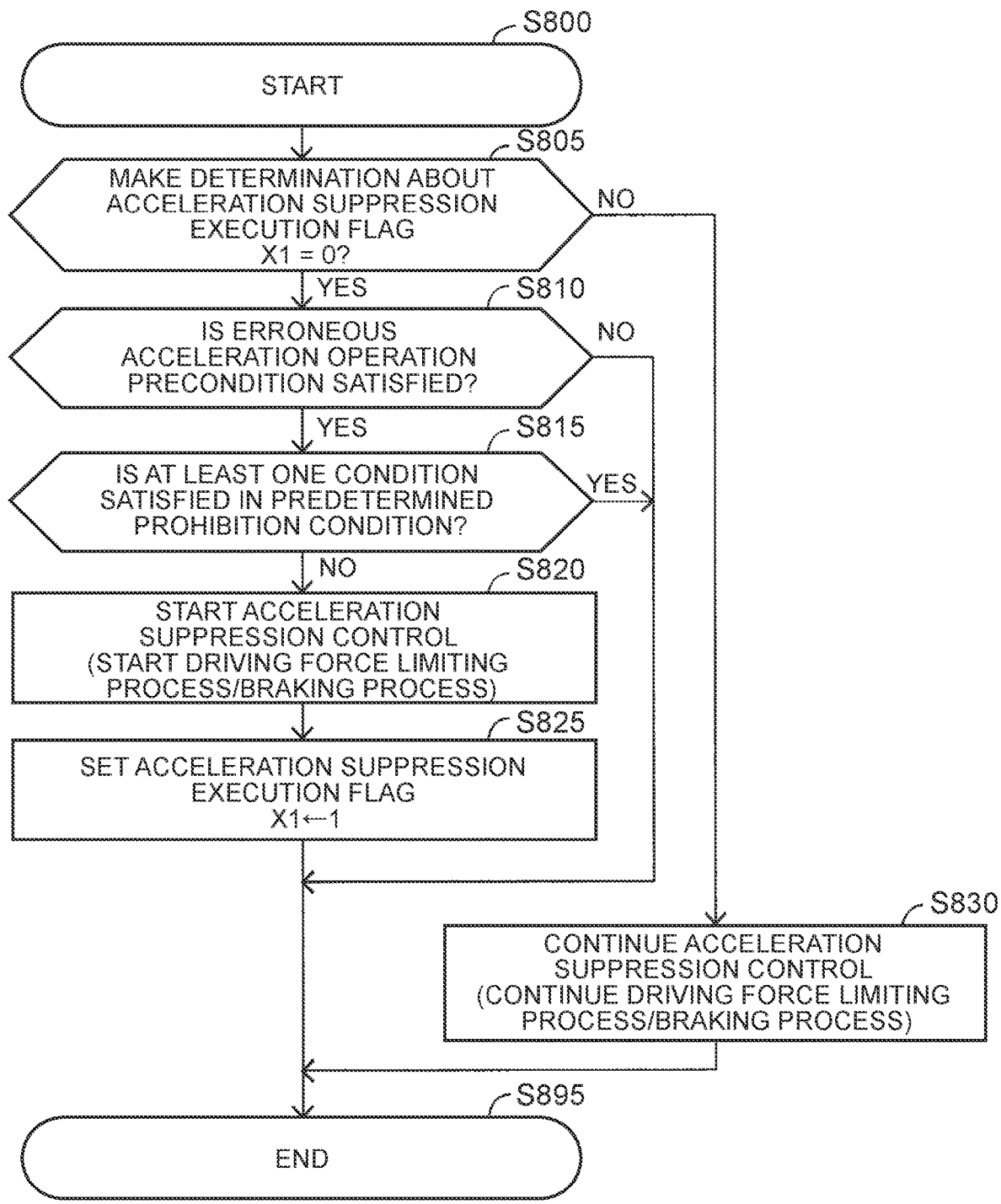
FIG. 8 is a flowchart showing a routine to be executed by the vehicle driving assistance device according to the embodiment of the present disclosure.
Figure 9:
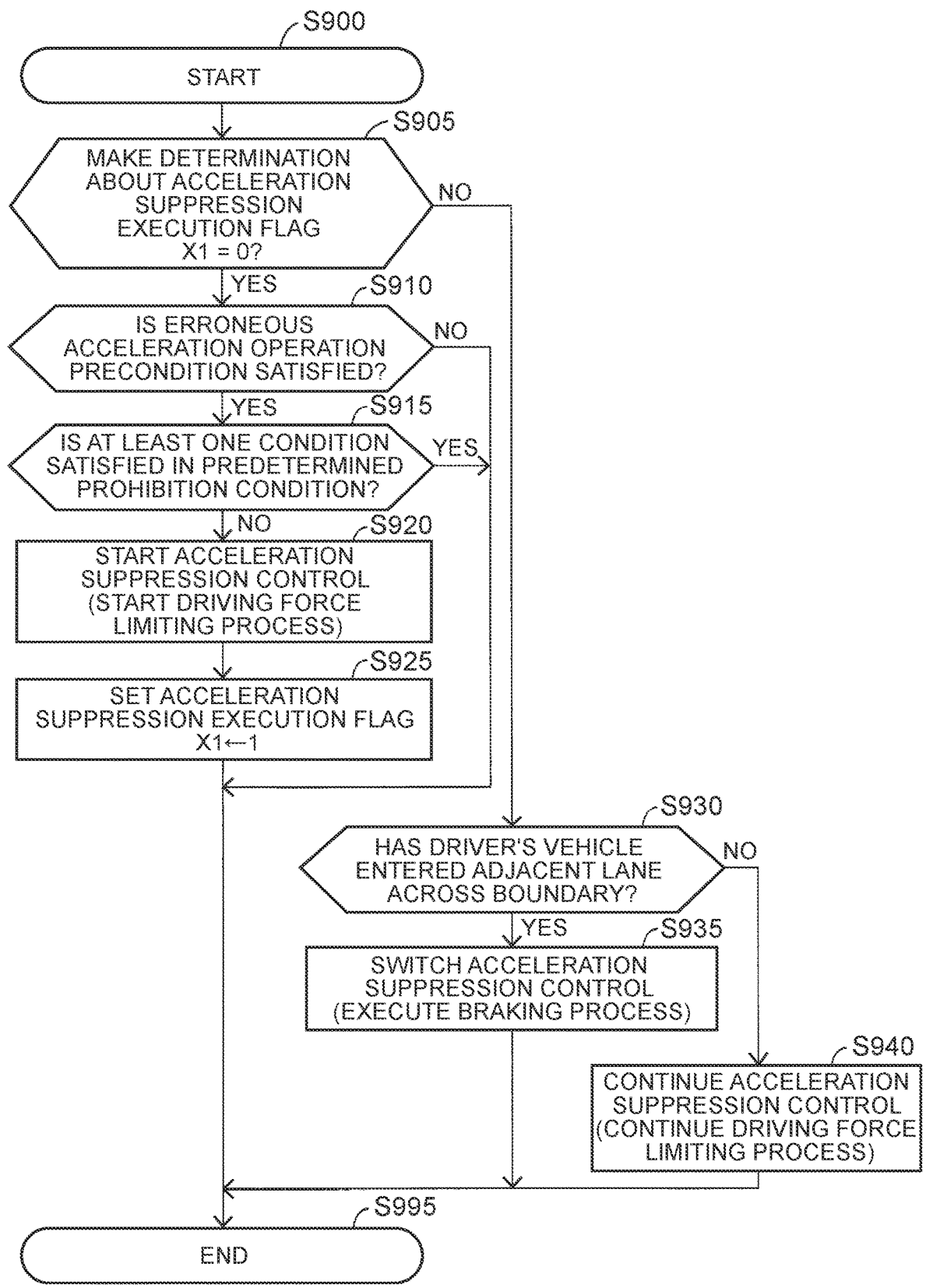
FIG. 9 is a flowchart showing a routine to be executed by the vehicle driving assistance device according to the embodiment of the present disclosure.

Alternatively, the CPU executes a routine shown in FIG. 9 in a predetermined calculation cycle in place of the routine shown in FIG. 8. At a predetermined timing, the CPU starts a process from Step S900 in FIG. 9, and advances the process to Step S905 to determine whether the value of the acceleration suppression execution flag X1 is "0".

When the CPU determines "Yes" in Step S905, the CPU advances the process to Step S910 to determine whether the erroneous acceleration operation precondition C10 is satisfied.

When the CPU determines "Yes" in Step S910, the CPU advances the process to Step S915 to determine whether at least one condition in the predetermined prohibition condition C30 is satisfied.

When the CPU determines "No" in Step S915, the CPU advances the process to Step S920 to start the driving force limiting process as the acceleration suppression control. Next, the CPU advances the process to Step S925 to set the value of the acceleration suppression execution flag X1 to "1". Next, the CPU advances the process to Step S995 to temporarily terminate this routine.

When the CPU determines "Yes" in Step S915, the CPU directly advances the process to Step S995 to temporarily terminate this routine.

When the CPU determines "No" in Step S910, the CPU directly advances the process to Step S995 to temporarily terminate this routine.

When the CPU determines "No" in Step S905, the CPU advances the process to Step S930 to determine whether the driver's vehicle 100 has entered the adjacent lane LN2 across the boundary BL1 of the driver's vehicle traveling lane LN1.

When the CPU determines "Yes" in Step S930, the CPU advances the process to Step S935 to switch the process serving as the acceleration suppression control from the driving force limiting process to the braking process. Next, the CPU advances the process to Step S995 to temporarily terminate this routine.

When the CPU determines "No" in Step S930, the CPU advances the process to Step S940 to continue the driving force limiting process as the process for the acceleration suppression control. Next, the CPU advances the process to Step S995 to temporarily terminate this routine.

The CPU executes a routine shown in FIG. 10 in a predetermined calculation cycle. At a predetermined timing, the CPU starts a process from Step S1000 in FIG. 10, and advances the process to Step S1005 to determine whether the value of the acceleration suppression execution flag X1 is "1".

When the CPU determines "Yes" in Step S1005, the CPU advances the process to Step S1010 to determine whether the termination condition C40 is satisfied.

When the CPU determines "Yes" in Step S1010, the CPU advances the process to Step S1015 to terminate the acceleration suppression control. Next, the CPU advances the process to Step S1020 to set the value of the acceleration suppression execution flag X1 to "0". Next, the CPU advances the process to Step S1095 to temporarily terminate this routine.

When the CPU determines "No" in Step S1010, the CPU directly advances the process to Step S1095 to temporarily terminate this routine.

When the CPU determines "No" in Step S1005, the CPU directly advances the process to Step S1095 to temporarily terminate this routine.

The above is the specific operation of the vehicle driving assistance device 10. In the routine of FIG. 8 or 9, determination may be made as to whether the traveling condition is satisfied before or after the determination as to whether the erroneous acceleration operation precondition is satisfied. The CPU may determine whether at least one condition in the predetermined prohibition condition is satisfied when the erroneous acceleration operation precondition is satisfied and the traveling condition is satisfied.

The present disclosure is not limited to the embodiment described above, and a variety of modifications can be adopted within the scope of the present disclosure.

What is claimed is:

1. A vehicle driving assistance device comprising a processor configured to execute acceleration suppression control for suppressing acceleration of a driver's vehicle in a case where a predetermined prohibition condition is not satisfied when an erroneous acceleration operation precondition is satisfied while a traveling condition is satisfied, the traveling condition being a condition for determining that the driver's vehicle is traveling, the erroneous acceleration operation precondition being a precondition for determining that an acceleration operation is erroneously performed, the acceleration operation being an operation performed by a driver of the driver's vehicle to request the acceleration of the driver's vehicle, the predetermined prohibition condition being based on a relationship between the driver's vehicle and an external environment of the driver's vehicle.

2. The vehicle driving assistance device according to claim 1, wherein the processor is configured not to execute the acceleration suppression control in a case where the predetermined prohibition condition is satisfied when the traveling condition is satisfied and the erroneous acceleration operation precondition is satisfied.

3. The vehicle driving assistance device according to claim 1, wherein the predetermined prohibition condition is a condition that an angle between a traveling direction of the driver's vehicle and a boundary closest to the driver's vehicle in the traveling direction of the driver's vehicle is larger than a predetermined permissible upper limit angle.

4. The vehicle driving assistance device according to claim 1, wherein the processor is configured to terminate the acceleration suppression control after the processor has started the acceleration suppression control, in a case where the driver's vehicle has entered an adjacent lane that is adjacent to a traveling lane of the driver's vehicle across a boundary of the traveling lane of the driver's vehicle and an angle between a traveling direction of the driver's vehicle and a boundary of the adjacent lane that is opposite to the traveling lane of the driver's vehicle is equal to or smaller than a predetermined adjacent lane boundary angle.

5. The vehicle driving assistance device according to claim 4, wherein:
the predetermined prohibition condition is a condition that an angle between the traveling direction of the driver's vehicle and the boundary of the traveling lane of the driver's vehicle is equal to or larger than a predetermined driver's vehicle traveling lane boundary angle; and
the predetermined adjacent lane boundary angle is set to a value smaller than the predetermined driver's vehicle traveling lane boundary angle.

6. The vehicle driving assistance device according to claim 1, wherein the processor is configured to terminate the acceleration suppression control after the processor has started the acceleration suppression control, in a case where the driver's vehicle has entered an adjacent lane that is adjacent to a traveling lane of the driver's vehicle across a boundary of the traveling lane of the driver's vehicle and an adjacent lane boundary crossing period is equal to or longer than a predetermined adjacent lane boundary crossing period, the adjacent lane boundary crossing period being a period required for the driver's vehicle to cross a boundary of the adjacent lane that is opposite to the traveling lane of the driver's vehicle.

7. The vehicle driving assistance device according to claim 1, wherein the processor is configured to terminate the acceleration suppression control after the processor has started the acceleration suppression control, in a case where the driver's vehicle has entered an adjacent lane that is adjacent to a traveling lane of the driver's vehicle across a boundary of the traveling lane of the driver's vehicle and an adjacent lane traveling period is equal to or longer than a predetermined adjacent lane traveling period, the adjacent lane traveling period being a traveling period in the adjacent lane after the driver's vehicle has entered the adjacent lane.

8. The vehicle driving assistance device according to claim 1, wherein the predetermined prohibition condition is a condition that an object is present ahead of the driver's vehicle in a traveling lane of the driver's vehicle.

9. The vehicle driving assistance device according to claim 1, wherein the predetermined prohibition condition is a condition that an object is present ahead of the driver's vehicle in a traveling lane of the driver's vehicle and a distance between the object and the driver's vehicle is equal to or shorter than a predetermined distance.

10. The vehicle driving assistance device according to claim 1, wherein the predetermined prohibition condition is a condition that another vehicle is traveling in an adjacent lane that is adjacent to a traveling lane of the driver's vehicle.

11. The vehicle driving assistance device according to claim 1, wherein the predetermined prohibition condition is a condition that a forward detection range of a peripheral information detection device of the driver's vehicle includes a blind spot in a range of an adjacent lane that is adjacent to a traveling lane of the driver's vehicle.

12. The vehicle driving assistance device according to claim 1, wherein the predetermined prohibition condition is a condition that a predicted period required for the driver's vehicle to cross a boundary of a traveling lane of the driver's vehicle is equal to or longer than a predetermined period.

13. The vehicle driving assistance device according to claim 1, wherein the processor is configured to execute the acceleration suppression control in a case where the driver's vehicle is stopped when the erroneous acceleration operation precondition is satisfied.

14. A non-transitory storage medium storing instructions that are executable by one or more processors and that cause the one or more processors to perform functions comprising executing acceleration suppression control for suppressing acceleration of a driver's vehicle in a case where a predetermined prohibition condition is not satisfied when an erroneous acceleration operation precondition is satisfied while a traveling condition is satisfied, the traveling condition being a condition for determining that the driver's vehicle is traveling, the erroneous acceleration operation precondition being a precondition for determining that an acceleration operation is erroneously performed, the acceleration operation being an operation performed by a driver of the driver's vehicle to request the acceleration of the driver's vehicle, the predetermined prohibition condition being based on a relationship between the driver's vehicle and an external environment of the driver's vehicle.

* * * * *